United States Patent Office 3,282,856
Patented Nov. 1, 1966

3,282,856
LUMINESCENT COMPOSITIONS CONTAINING EUROPIUM AND THE OXYANION-YIELDING INGREDIENT ALUMINUM, GALLIUM OR GERMANIUM
Hans J. Borchardt, Wilmington, Del., assignor to E. I. du Pont de Nemours and Company, Wilmington, Del., a corporation of Delaware
No Drawing. Filed Dec. 21, 1965, Ser. No. 515,461
10 Claims. (Cl. 252—301.4)

This application is a continuation-in-part of application Serial No. 186,602 filed April 1, 1962.

This invention relates to chemical compositions and, more particularly, to luminescent compositions.

Luminescent materials, including phosphorescent and fluorescent materials, have found wide acceptance in the art in such uses as TV tubes, fluorescent lights, radiation detectors, radarscopes, and other detection devices. Such luminescent materials, that is, luminophors, emit radiation, for example, visible radiation, on excitation with ultraviolet light, X-rays, cathode rays, and the like. Examples of such commercial luminophors are calcium tungstate, copper-activated zinc cadmium selenide, barium-lead sulfate, silver-activated zinc sulfide, titanium-activated alkaline earth selenides and manganese-activated zinc-beryllium silicates.

Commercial luminophors have been subject to several limitations. First, they are hypersensitive to impurities. Not only does such sensitivity present problems as far as use is concerned, but in addition, it presents great problems in the preparation of the luminophors. Small portions of impurity materials introduced either during use or during preparation markedly alter the luminescence of such commercial luminescent materials. Second, some luminophors, such as selenides and arsenides, are highly toxic and thus create hazards during processing and potential hazards in use. Third, completely satisfactory phosphors are not available in all colors; to date, no completely satisfactory bright red luminophor has been obtained.

Rare earth elements have been used in the preparation of luminescent materials. In the art, such rare earth elements have been used as activators, that is, they have been used as intentionally added "impurity" materials. For example, alkaline earth silicates have been activated with minute quantities of rare earth elements. The characteristic feature of such prior art luminophors is that the minute quantities of rare earth activator incorporated therein are employed to produce band emission by causing defects in the host crystal lattice and emission from the defective region in the vicinity of the "impurity" atoms.

Optimum luminescent properties are conventionally obtained in phosphors with proportions of activating material on the order of 0.0001 to 0.01 mole of activator per mole of base material. In general, with conventional phosphors, further increasing the proportion of the "impurity" activator decreases luminescent intensity, and in some cases, quenches it. Conventional rare earth activated luminophors quench out quite rapidly when the rare earth activator concentration is increased to levels in excess of one mole percent because of activator-activator interaction.

In accordance with this invention, it has been discovered that a unique group of materials emit exceptionally bright red light on excitation, are easy to prepare and are remarkably insensitive to impurities both during preparation and use; hence, the aforementioned materials are eminently suited for use in luminescent coatings, compositions and luminescent articles fabricated therefrom.

The luminescent materials employed in accordance with this invention consist essentially of substantially colorless luminophor composed of two rare earth-containing components, each associated with a common oxygen-containing anion, one rare earth component containing europium and the second rare earth component containing at least one element selected from the group consisting of scandium, yttrium, lanthanum, gadolinium and lutetium, said europium component being present in solid solution with said second rare earth component, and europium being present within the range of about from 3 to 80 mole percent of the total rare earth ions present in such solid solution.

Luminescent articles of this invention comprise (a) at least one of the aforementioned luminescent materials, optionally in admixture with other luminescent materials, intimately associated with (b) a protective layer of a material transparent to radiation emitted by the aforementioned luminescent materials.

As indicated above, scandium and yttrium, as well as lanthanum, gadolinium, lutetium and europium are considered as rare earth elements herein. The terms "anion" and "cation" as used herein are used to describe the stoichiometry of the solid solutions comprising the luminophors employed in this invention, but not necessarily the precise bonding of the elements in such solid solutions.

The luminophors of this invention are prepared by intimately mixing a rare earth compound containing Eu+3 as the cationic (i.e, rare earth) species, at least one other compound containing one of the rare earth elements in the aforementioned second rare earth component as the cationic species and an oxyanion-yielding ingredient containing aluminum, gallium or germanium, and heating the resulting mixture in a non-reducing atmosphere such as air, at a temperature of at least about 700° C., usually at least about 900° C., and preferably 1000–1500° C., but below the fusion temperature of the mass, for a period usually of at least 30 minutes, and preferably about from 1 to 4 hours.

Accordingly, the luminophors employed in this invention are substantially colorless solid solutions of the formula:

wherein RE represents at least one rare earth element selected from the group consisting of scandium, yttrium, lanthanum, gadolinium and lutetium, $x$ is 0.03 to 0.8 and A is an inorganic oxyanion consisting of oxygen and one of the group consisting of aluminum, gallium or germanium, the europium component being in solid solution with the RE component. Preferably, the ratio of non-oxygen atoms in A to the combined numbers of rare earth atoms in the composition is not greater than 4. The luminophors should be high melting, e.g., melt above about 700° C., substantially colorless, crystalline solids. Rare earth compounds having aluminum, gallium and germanium as components of the metal-containing oxyanions, result in luminophors having a desirable combination of properties. In addition, the oxyanions of aluminum, gallium and germanium in combination with europium and the above listed rare earth elements form some of the brightest luminescent compositions. Furthermore, at least one of the compositions, i.e., $(Y_{0.95}Eu_{0.05})_2O_3 \cdot 2GeO_2$, continues to glow for about one second after the excitation source is removed. This property makes this composition especially useful in oscillograph tubes were photographs are taken or when visual observations are made.

The luminophors of this invention can be viewed as a crystal lattice of at least one oxyanionic compound of lanthanum, gadolinium, lutetium, scandium and yttrium in which atoms of europium are substituted for the aforementioned rare earth elements. Preferably, the luminophors of this invention consist of only one phase. However, they can contain more than one phase each having europium in solid solution. For example, the luminophors of this invention encompass systems containing $(Y_{1-x}Eu_x)_2O_3 \cdot Al_2O_3$ and $(Y_{1-x}Eu_x)_2O_3 \cdot 5/3Al_2O_3$ which are phases capable of coexistence in the $$Y_2O_3 — Eu_2O_3 — Al_2O_3$$

system and each of which in itself is a luminescent solid solution containing europium. Hence, when reference is made herein to europium being present in solid solution, the critical factor referred to is that the europium present is present in a solid solution, whether it be present in solid solution in one or more phases. The term "luminophor" is used herein in both the singular and plural to describe the luminescent materials in the compositions of this invention, including those containing one, two, or more europium-containing solid solution phases.

As noted hereinbefore, the europium in the luminophors of this invention constitutes at least about 3%, but less than about 80% of the total rare earth ions, that is, the total of europium and the rare earth ions in the second rare earth component. Generally, at least about 10 percent of europium is preferred for optimum brightness of emission. The particular amount of europium which is present in the rare earth luminophors of the compositions of this invention depends to a large extent upon the other rare earth elements in the second rare earth component with which it is associated, and upon the particular oxygen-containing anion species which is present. In addition, the oxyanion compounds of yttrium-, scandium-, and lutetium are often not isostructural with the cognate europium compound and a second phase forms at high europium concentrations. For example, with yttrium germanate, a second phase forms at about 20 mole percent europium, based on the total rare earth ions, where the range of solubility of the europium germanate is exceeded. Thus, the luminophors of this invention are solid solutions of an europium compound and at least one cognate compound of the specified rare earth elements, the percentage of europium being in the range of about 3 to 80 mole percent based on the total rare earth ions present, the maximum europium concentration in those systems in which the europium and cognate rare earth compound are isostructural being less than about 80 mole percent, and, in those systems in which the europium and cognate rare earth compound are not isostructural, being no greater than the maximum solubility of the europium component in the second rare earth component in each phase.

Illustrative solid solutions comprising the luminophors of this invention are:

$(La_{1-x}Eu_x)_2O_3 \cdot GeO_2$ with $x=0.1$ to $0.6$
$(Gd_{1-x}Eu_x)_2O_3 \cdot GeO_2$ with $x=0.1$ to $0.6$
$(Y_{1-x}Eu_x)_2O_3 \cdot GeO_2$ with $x=0.1$ to $0.2$
$(Y_{1-x}Eu_x)_2O_3 \cdot Ga_2O_3$ with $x=0.1$ to $0.2$
$(Y_{1-x}Eu_x)_2O_3 \cdot 5/3Ga_2O_3$ with $x=0.1$ to $0.2$
$(Sc_{1-x}Eu_x)_2O_3 \cdot 5/3Al_2O_3$ with $x=0.1$ to $0.2$
$(Gd_{1-x}Eu_x)_2O_3 \cdot 5/3Al_2O_3$ with $x=0.1$ to $0.2$
$(Lu_{1-x}Eu_x)_2O_3 \cdot 5/3Al_2O_3$ with $x=0.1$ to $0.2$
$(Y_{1-x-y}Gd_yEu_x)_2O_3 \cdot 5/3Ga_2O_3$ with $x=0.1$ to $0.2$, with $y=0.1$ to $0.4$ In relating the formula $(RE_{1-x}Eu_x)_2O_3 \cdot A$ to solid solutions above, it should be noted that in any particular solid solution the ratio of A to the remainder of the constituents, that is, to $(RE_{1-x}Eu_x)_2O_3$, is fixed; however, depending upon the particular oxyanionic species employed, several different solid solutions with different ratios of A to $(RE_{1-x}Eu_x)_2O_3$ can be prepared. Thus, for example, as indicated above, in the system $Y_2O_3—Eu_2O_3—Ga_2O_3$ separate and distinct solid solutions where A is $1Ga_2O_3$ and $5/3Ga_2O_3$ can be prepared.

The luminophors employed in the compositions of this invention and described above can be characterized by conventional X-ray powder diffraction techniques. X-ray spectra can be conveniently determined on a Norelco X-ray diffraction unit using a recording spectrometer, $Cuk_\alpha$ radiation, 1° slits, a nickel filter and a scan rate of 1° of $2\theta$/min. If greater resolution is desired, a Guinier camera can be employed. The X-ray patterns of each of the families of the solid solutions in compositions of this invention are characteristic thereof and are different from the patterns of both the individual components in the solid solutions and the reactants leading to their formation. For instance, the diffraction patterns are different for solid solutions of La—Eu aluminates as compared to physical mixtures of the individual La and Eu aluminates. Similarly, if $(La_{0.5}Eu_{0.5})_2O_3 \cdot 2GeO_2$ is prepared by reaction of lanthanum oxide, europium oxide and germanium dioxide, the resulting pattern of the product of this reaction will be different from that of either europium oxide, lanthanum oxide or germanium dioxide. In a given series of solid solutions differing only in europium concentration, the X-ray patterns of the series will be substantially similar differing only in a slight and gradual shift in the characterizing peaks as the europium concentration increases.

As has been noted hereinbefore, in many cases a one-phase luminophor is obtained with all europium concentrations within the limits specified hereinbefore, while with other luminophors, a new phase appears at the limit of solubility of europium in the crystal lattice. The presence of this new phase is indicated by the appearance of a new X-ray pattern impressed upon that of the first and characteristic of that of the new phase.

The maximum solubility of the europium component is readily determined from the proportions of materials employed in preparing the composition in which the new phase first appears, that is, the appearance of the new phase indicates that composition in which solubility is just exceeded. Also, as noted hereinbefore, depending upon the nature and proportion of oxyanion contributing constituent used in forming a luminophor, several different luminescent solid solutions may result. For example, in the $Y_2O_3—Eu_2O_3—Al_2O_3$ system, depending on the proportion of $Al_2O_3$ employed, $(Y_{1-x}Eu_x)_2O_3 \cdot Al_2O_3$, $(Y_{1-x}Eu_x)_2O_3 \cdot 5/3Al_2O_3$, or both, can be obtained. Each of these solid solutions has a separate and distinct X-ray diffraction pattern. The fact that each of the aforementioned materials is a distinct solid solution of rare earth compounds of definite rare earth/anion composition and not merely a mixture of the respective yttrium-europium components is determined by preparing a series of products of constant rare earth composition and varying proportions of the anionic-contributing species and noting the changes in the X-ray patterns of the compositions obtained. Taking the example above, the solid solution $(Y_{0.8}Eu_{0.2})_2O_3 \cdot Al_2O_3$ is characterized by one diffraction pattern and the solid solution $(Y_{0.8}Eu_{0.2})_2O_3 \cdot 5/3Al_2O_3$ is characterized by a second pattern. The product formed, for example, wherein the ratio of rare earth oxide to $Al_2O_3$ is intermediate between 1:1 and 1:3 is characterized by lines representing both of the aforementioned solid solution phases. The composition of each of the "pure" phases above is determined from the proportions of reactants at the point in the series wherein only lines representing one solid solution (one phase) appear and those indicating the presence of any other solid solution are not present.

As is recognized in the art, X-ray powder patterns may not reveal the presence of a phase unless about 5% of that phase is present. Accordingly, it is possible, though not likely, that stated formulae indicated herein may deviate by an amount consistent with the aforementioned limitation and should be so interpreted.

As stated hereinbefore, the products of this invention are prepared by mixing starting materials comprising a europium component and a second rare earth component, the starting materials including, either as separate component or as part of the rare earth components, a component which contributes an oxygen-containing anion, and thereafter heating the resulting mixture at elevated temperatures. As indicated hereinbefore, a reaction temperature of at least about 700° C. to above about 1700° C., and usually at least about 900° C., is employed; however, since the reaction time decreases as the reaction temperature increases, to insure complete reactions in practical periods of time, high reaction temperatures approaching, e.g., within 100° C. of, but in any case below, the temperature at which localized fusion of the reaction mass begins are preferred.

The rare earth components are preferably introduced into the reaction mixture as oxides. However, rare earth components which decompose to the oxide on heating, for example, rare earth hydroxides, oxalates, carbonates, citrates, acetates and tartrates can be employed. The oxyanion-contributing component also is preferably introduced in the form of an oxide such as, for example, aluminum oxide, gallium oxide and germanium oxide. However, the oxyanion-contributing reactant need not be necessarily in the form of an oxide. It can be, for example, in the form of a compound such as gallium hydroxide, aluminum hydroxide, aluminum acetate, or oxalate, which on ignition is converted to the oxide. Alternatively, although less preferred, the solid solutions can be prepared by mixing each of the "preformed" components of the solid solution and heating at elevated temperatures. For example, the luminophor $$(La_{0.5}Eu_{0.5})_2O_3 \cdot Al_2O_3$$

can be prepared from equimolar quantities of lanthanum aluminate $(La_2O_3 \cdot Al_2O_3)$ and europium aluminate $$(Eu_2O_3 \cdot Al_2O_3)$$

Reactants are preferably introduced in the form of finely ground particulate material, preferably having a particle size of less than 10 microns.

The quantities of reactants employed in preparing the luminophors of this invention are preferably approximately stoichiometric based on the desired composition of the final product. Since the oxides of aluminum, gallium and germanium are colorless, quantities somewhat greater than stoichiometric, for example, 10 or 20% excess, can be tolerated, since the excess oxide in the resulting products merely acts as an inert diluent. In general, provided that all of the europium occurs in the final product in solid solution, excess rare earth component has no deleterious effect.

As noted hereinbefore, in some systems such as yttrium europium germanate, a second phase appears at relatively high europium content, for example, in the yttrium europium system, at about 20% europium, based on the total rare earth ions present. An excess of the europium contributing constituent over that necessary to yield the desired luminophor can be employed, although again, stoichiometric proportions which yield compositions containing substantially only the desired luminophor are preferred. Proportions of such second phase, for example, a few percent based on the total composition, can be tolerated and still provide a brightly luminescent composition.

The particular combination of rare earth elements employed in the luminophors described herein and the large number of emitting europium ions which can be and are therein yield compositions in accordance with this invention of unusual brightness. On excitation, the products of this invention emit a bright red light, the specific shade (emission spectrum) of which varies from composition to composition. Although the products of this invention all emit on excitation by ultraviolet light, the luminescent properties on excitation by different wave lengths of ultraviolet light or on being subjected to other types of excitation, for example, cathode rays, vary somewhat from luminophor to luminophor. For example $$(Y_{0.95}Eu_{0.05})_2O_3 \cdot GeO_2$$

continues to glow for about one second after the excitation is removed, whereas $(Y_{0.9}Eu_{0.1})_2O_3 \cdot 5/3Al_2O_3$ does not exhibit visually detectable persistence.

In addition to the foregoing, the products of this invention are remarkably insensitive by luminophor standards to impurities, both during preparation and during use.

As noted hereinbefore, the luminescent articles of this invention comprise at least one of the aforementioned luminophors, optionally in a mixture with conventional luminescent materials, intimately associated or in adherent contact with a protective layer of a material transparent to radiation emitted by the aforementioned luminophors, that is, visible, and particularly red light. The particular structure of the luminescent articles and the manner in which the luminophor is embodied therein depends to a great extent upon the utility for which such articles are to be used. The luminophor, for example, can be embedded in the transparent material, adhered to one or more surfaces thereof, combined with just sufficient binder to hold the luminophor particles together and sandwiched between two layers of transparent material, or a combination of these. More specifically, for example, in luminescent signs, the luminophor can be embedded in a polymeric material transparent to incident and emitted radiation and, for example, used as such or, perhaps, adhered to a signboard. In fluorescent lights, the luminophor is conveniently merely adhered to the inner surface of a fluorescent light tube. In cathode ray tubes, the luminophor can be adhered to the inner surface of the glass face plate and, if desired, additional layers, for example, of polymeric material or aluminum transparent to incident radiation applied thereover.

The luminophors can be associated with one or more protective layers transparent to emitted radiation. For example, the luminophor can be combined with binder and sandwiched between two or more adherent protective layers, or the luminophor and binder therefor can be coated on the surface of a material transparent to emitted radiation. The shape of the luminescent articles is not critical. They can be flat as in luminescent signs, or curved as in fluorescent lights and cathode ray tubes, or even in the form of blocks or cubes which can be used, for example, as raised letters on signs. Examples of luminescent articles prepared in accordance with this invention are fluorescent lights; high pressure mercury vapor lamps, e.g., for street lighting; radiation detectors; luminescent signs, markers and identification devices; TV tubes, cathode ray oscillographs; electron microscope viewing windows; luminescent sheets, films, coatings, and other shaped articles.

Examples of materials transparent to radiation emitted by the aforementioned phosphors are organic polymeric materials such as homopolymers and copolymers of alkyl acrylates and methacrylates such as methyl methacrylate; polyvinyl acetate; polyethylene; chlorosulfonated polyethylene; polypropylene; polystyrene; polyepoxides; polyesters such as polyethylene terephthalate; polyacrylonitrile; homopolymers and copolymers of vinyl chloride; polyvinyl alcohol; cellulose derivatives such as nitrocellulose and ethyl cellulose; inorganic materials such as various glasses, including silicate and borate glasses, and transparent crystalline materials such as lithium fluoride and sodium chloride as well as various compatible mixtures thereof.

The subject invention relates to the use of the aforementioned luminescent materials in the aforementioned articles. The particular method of fabrication of such articles is not the essence of this invention; any of the conventional techniques therefore can be employed. However, by way of illustration, the luminophors mentioned hereinbefore can be finely ground and, if desired, mixed with other luminescent materials such as calcium tungstate, barium-lead sulfate, antimony- and manganese-activated calcium halophosphates, selenium-activated zinc sulfide, manganese-activated zinc orthosilicate or a mixture thereof to yield products emitting light of the desired color balance. As is conventional in the art, for example, the resulting compositions can be dispersed in a solution or dispersion of a binder, for example, a binder of one or more of the aforementioned materials transparent to emitted radiation. The resulting compositions then can be coated onto a surface, for example, a signboard, and solvent evaporated therefrom to yield a luminescent coating wherein luminophor is embedded in a layer of binder transparent to incident and emitted radiation. Such dispersions of luminophor and binder can also be cast into self-supporting sheets and films.

Fluorescent lights can be prepared, for example, by milling finely divided, for example, 3- to 12-micron, luminophor of this invention, together with other luminescent materials yielding the desired color balance with low viscosity ethyl cellulose or nitrocellulose dissolved in xylol and dibutylphthalate. The resulting composition then can be applied to the inner surface of a standard fluorescent light tube, for example, by conventional flush, flow or spray methods, and dried. Finally, the coated tube can be heated to a temperature just below the melting point of the glass tube, usually a temperature greater than 700° C., to oxidize the organic binder and adhere the luminophor to the glass. The resulting product of this invention comprises a layer of luminophor adhered to the inner surface of a tubular protective layer of glass. The tubes prepared as described above can be fabricated into a finished fluorescent light by standard procedures such as, for example, those described in the "Encyclopedia of Chemical Technology," volume 8, Interscience Publishers, Inc., pages 202–206 (1952).

Cathode ray tubes can be prepared, for example, by first introducing a cushioning layer, for example, of water or a mixture of alcohol and ether, onto the inner surface plate of the tube, then distributing, for example, spraying, a solution of the luminophor in water or alcohol over the surface of the cushioning layer and allowing the luminescent material to precipitate onto the face plate. Next, the cushioning liquid can be withdrawn from the tube and the resulting product dried. Subsequently, further coatings, for example, of sodium or potassium silicate, nitrocellulose and/or aluminum can be applied to the inner surface of the luminophor layer by conventional procedures such as those described in U.S. Patent 2,710,-262.

The concentration of luminophor and binder used in preparing products of this invention as described above varies greatly with the particular article being fabricated. Thus, for example, in preparing luminescent coating compositions wherein the final article comprises luminophor embedded in the binder, relatively large proportions of binder are employed so that in the resulting product the binder encases and protects the luminophor. In such cases, as low as 50% or less, but usually on the order of 70 to 90% of binder based on the weight of binder and luminophor is employed. In the fabrication of fluorescent lights, the solution of binder merely serves as an application medium for the luminophor and is completely burned off during fabrication of such lights as described above. Normally, relatively dilute concentrations of binder are employed. If the luminophor is to be sandwiched between two protective layers, it may be desirable to use just sufficient binder to hold tht luminophor particles together, for example, 2 to 5% based on the weight of luminophor and binder.

In the following examples which illustrate this invention, parts and percentages are by weight unless otherwise indicated.

*Example I*

A luminescent composition consisting essentially of a single solid solution phase having the formula $$(La_{0.8}Eu_{0.2})_2O_3 \cdot Al_2O_3$$

is prepared by thoroughly mixing 0.258 part lanthanum oxide, 0.0705 part europium oxide and 0.156 part aluminum hydroxide and heating the mixture at 1400° C. for 4 hours. The product is X-rayed. The pattern is shown below.

| Line No. | $(La_{0.8}Eu_{0.2})_2O_3 \cdot Al_2O_3$ ||
|---|---|---|
| | d | I/I₀ |
| 1 | 3.76 | 60 |
| 2 | 2.66 | 100 |
| 3 | 2.178 | 35 |
| 4 | 1.886 | 35 |
| 5 | 1.685 | 15 |
| 6 | 1.541 | 20 |

When the product is viewed under short wavelength ultraviolet light from a 2537 A. mineralite hand lamp, it is found to have a brightness value of 5 on a scale where 0 is no detectable luminescence, 5+ is the brightest and 1 through 4 intermediate brightness as judged visually.

*Example II*

The procedure indicated above in Example I is again repeated except that 0.290 part gadolinium oxide, 0.0705 part europium oxide and 0.156 part aluminum hydroxide are mixed and heated at 1400° C. for 4 hours. The product is X-rayed and found to have the pattern below.

| Line No. | $(Gd_{0.8}Eu_{0.2})_2O_3 \cdot Al_2O_3$ ||
|---|---|---|
| | d | I/I₀ |
| 1 | 3.72 | 70 |
| 2 | 3.32 | 10 |
| 3 | 2.65 | (¹) |
| 4 | 2.63 | 100 |
| 5 | 2.16 | 25 |
| 6 | 2.14 | 25 |
| 7 | 1.86 | 35 |

¹ Shoulder on line 4.

When the product is viewed under short wavelength ultraviolet light as in Example I, it is found to have a brightness value of 5+.

*Example III*

The procedure indicated above in Example I is again repeated except that 0.180 part yttrium oxide, 0.0705 part europium oxide and 0.156 part aluminum hydroxide are mixed and the mixture is heated 4 hours at 1400° C. and 1 hour at 1700° C. The product is X-rayed and found to have the pattern below.

Examples IV to XV

The procedure described in Example I is again repeated but substituting the following reactants under the conditions indicated:

| Solid Solution | Parts of Reactants | | | Temp., °C. | Time, Hours | Brilliance Rating UV Excitation, A. |
|---|---|---|---|---|---|---|
| | $RE_2O_3$ | $Eu_2O_3$ | Oxyanion Contrib. Reactant | | | |
| $(Sc_{0.9}Eu_{0.1})_2O_3 \cdot 2GeO_2$ | 0.622 | 0.176 | 1.046 ($GeO_2$) | 1,400 | 2 | 4 (2,537) |

| Line No. | $(Y_{0.8}Eu_{0.2})_2O_3 \cdot Al_2O_3$ | |
|---|---|---|
| | d | I |
| 1 | 4.86 | M. |
| 2 | 4.66 | VW. |
| 3 | 4.22 | W. |
| 4 | 3.69 | S. |
| 5 | 3.31 | M. |
| 6 | 3.20 | M. |
| 7 | 3.00 | M. |
| 8 | 2.90 | M. |
| 9 | 2.68 | S. |
| 10 | 2.65 | S. |
| 11 | 2.61 | VS. |
| 12 | 2.59 | S. |
| 13 | 2.54 | VW. |
| 14 | 2.495 | M. |
| 15 | 2.450 | M. |
| 16 | 2.355 | W. |
| 17 | 2.220 | W. |
| 18 | 2.190 | M. |
| 19 | 2.155 | S. |
| 20 | 2.120 | S. |

VW, very weak; S, strong; M, medium; VS, very strong; W, weak.

The compound is X-rayed and the diffraction data is given below:

| Line No. | $(Sc_{0.9}Eu_{0.1})_2O_3 \cdot 2GeO_2$ | |
|---|---|---|
| | d | $I/I_0$ |
| 1 | 5.13 | 5 |
| 2 | 4.32 | 15 |
| 3 | 3.84 | 5 |
| 4 | 3.20 | 100 |
| 5 | 2.97 | 40 |
| 6 | 2.63 | 10 |
| 7 | 2.58 | 15 |
| 8 | 2.45 | 10 |
| 9 | 2.43 | 5 |
| 10 | 2.39 | 5 |
| 11 | 2.32 | 10 |
| 12 | 2.23 | 5 |
| 13 | 2.17 | 10 |
| 14 | 2.14 | 5 |
| 15 | 2.06 | 10 |

| Solid Solution | Parts of Reactants | | | Temp., °C. | Time, Hours | Brilliance Rating UV Excitation, A. |
|---|---|---|---|---|---|---|
| | $RE_2O_3$ | $Eu_2O_3$ | Oxyanion Contrib. Reactant | | | |
| $(Y_{0.8}Eu_{0.2})_2O_3 \cdot Ga_2O_3$ | 0.6143 | 0.2394 | 0.6373 ($Ga_2O_3$) | 1,400 | 4 | 5+ (2,537) |

When the product is viewed under short wavelength ultraviolet light as in Example I, it is found to have a brightness of 5.

The compound is X-rayed and tre diffraction data is given below:

| Line No. | (Y$_{0.8}$Eu$_{0.2}$)$_2$O$_3$·Ga$_2$O$_3$ | |
|---|---|---|
| | d | I/I$_0$ |
| 1 | 4.30 | 15 |
| 2 | 3.10 | 50 |
| 3 | 3.05 | 80 |
| 4 | 2.77 | 100 |
| 5 | 2.64 | 20 |
| 6 | 2.54 | 65 |
| 7 | 2.43 | 5 |
| 8 | 2.25 | 10 |
| 9 | 2.07 | 10 |
| 10 | 2.01 | 10 |
| 11 | 1.93 | 10 |
| 12 | 1.871 | 30 |
| 13 | 1.869 | 25 |
| 14 | 1.792 | 15 |

| Solid Solution | Parts of Reactants | | | Temp., °C. | Time, Hours | Brilliance Rating UV Excitation, A |
|---|---|---|---|---|---|---|
| | RE$_2$O$_3$ | Eu$_2$O$_3$ | Oxyanion Contrib. Reactant | | | |
| (La$_{0.8}$Eu$_{0.2}$)$_2$O$_3$·GeO$_2$ | 0.8993 | 0.2429 | 0.3609 (GeO$_2$) | 1,400 | 4 | 5 (2,537) |
| (Gd$_{0.8}$Eu$_{0.2}$)$_2$O$_3$·GeO$_2$ | 0.9281 | 0.2253 | 0.3347 (GeO$_2$) | 1,400 | 4 | 5 (2,537) |
| (Y$_{0.8}$Eu$_{0.2}$)$_2$O$_3$·GeO$_2$ | 0.5872 | 0.2288 | 0.6799 (GeO$_2$) | 1,400 | 4 | 5 (2,537) |
| (Y$_{0.8}$Eu$_{0.2}$)$_2$O$_3$·5/3Ga$_2$O$_3$ | 0.4878 | 0.1901 | 0.8435 (Ga$_2$O$_3$) | 1,400 | 4 | 5+ (2,537) |
| (Sc$_{0.8}$Eu$_{0.2}$)$_2$O$_3$·5/3Al$_2$O$_3$ | 0.2764 | 0.1760 | 0.6498 (Al$_2$O$_3$) | 1,400 | 4 | 3 (2,537) |
| (Gd$_{0.8}$Eu$_{0.2}$)$_2$O$_3$·5/3Al$_2$O$_3$ | 0.7236 | 0.1760 | 0.6498 (Al$_2$O$_3$) | 1,400 | 4 | 5+ (2,537) |
| (Lu$_{0.8}$Eu$_{0.2}$)$_2$O$_3$·5/3Al$_2$O$_3$ | 0.7960 | 0.1760 | 0.6498 (Al$_2$O$_3$) | 1,400 | 4 | 5 (2,537) |
| (Lu$_{0.9}$Eu$_{0.1}$)$_2$O$_3$·5/3Al$_2$O$_3$ | 0.895 | 0.088 | 0.649 (Al$_2$O$_3$) | 1,700 | 2 | 5 (2,537) |
| (Gd$_{0.8}$Eu$_{0.2}$)$_2$O$_3$·5/3Ga$_2$O$_3$ | 0.5800 | 0.1408 | 0.6248 (Ga$_2$O$_3$) | 1,400 | 4 | 5 (2,537) |
| (La$_{0.8}$Eu$_{0.2}$)$_2$O$_3$·5/3Ga$_2$O$_3$ | 0.7820 | 0.2112 | 0.5625 (Ga$_2$O$_3$) | 1,400 | 4 | 5 (2,537) |

I claim:
1. A luminescent composition consisting essentially of a substantially colorless luminophor of the formula:

$$(RE_{1-x}Eu_x)_2O_3 \cdot A$$

wherein RE is at least one rare earth element selected from the group consisting of scandium, yttrium, lanthanum, gadolinium and lutetium, $x$ is 0.03 to 0.8 and A is an inorganic oxyanion consisting of oxygen and one of the group consisting of aluminum, gallium and germanium, the europium component being in solid solution with the RE component.

2. A luminescent composition of claim 1 wherein A is an inorganic oxyanion consisting of oxygen and aluminum.

3. A luminescent composition of claim 1 wherein A is an inorganic oxyanion consisting of oxygen and gallium.

4. A luminescent composition of claim 1 wherein A is an inorganic oxyanion consisting of oxygen and germanium.

5. A luminescent composition of claim 1 in which the rare earths therein are europium and lanthanum.

6. A luminescent composition of claim 1 in which the rare earths therein are europium and gadolinium.

7. A luminescent composition of claim 1 in which the rare earths therein are europium and lutetium.

8. A luminescent composition of claim 1 in which the rare earths therein are europium and scandium.

9. A luminescent composition of claim 1 in which the rare earths therein are europium and yttrium.

10. A luminescent composition which comprises at least one luminescent material consisting essentially of a substantially colorless luminophor of the formula $$RE_{1-x}Eu_x)_2O_3 \cdot A$$

wherein RE is at least one rare earth element selected from the group consisting of scandium, yttrium, lanthanum, gadolinium and lutetium, $x$ is 0.03 to 0.8 and A is an inorganic oxyanion consisting of oxygen and one of the group consisting of aluminum, gallium and germanium, said europium component being in solid solution with the RE component and a binder therefor.

No references cited.

TOBIAS E. LEVOW, *Primary Examiner.*

R. D. EDMONDS, *Assistant Examiner.*

UNITED STATES PATENT OFFICE
CERTIFICATE OF CORRECTION

Patent No. 3,282,856                                November 1, 1966

Hans J. Borchardt

It is hereby certified that error appears in the above numbered patent requiring correction and that the said Letters Patent should read as corrected below.

Column 3, line 16, for "were" read -- where --; column 8, line 17, for "tht" read -- the --; column 11, line 1, for "tre" read -- the --; columns 11 and 12, in the table, under the heading "Solid Solution", first column, line 6, thereof, for "$(Gd_{08.}Eu_{0.2})$" read -- $(Gd_{0.8}Eu_{0.2})$ --; same columns same table and heading, line 10, for ".$5/3Ga_2O_3$" read -- .$Ga_2O_3$ --; column 12, line 35, for "$RE_{1-x}Eu_x)_2O_3 \cdot A$" read -- $(RE_{1-x}Eu_x)_2O_3 \cdot A$ --.

Signed and sealed this 5th day of September 1967.

(SEAL)
Attest:

ERNEST W. SWIDER                              EDWARD J. BRENNER
Attesting Officer                              Commissioner of Patents